(12) United States Patent
Rekimoto

(10) Patent No.: US 6,188,404 B1
(45) Date of Patent: Feb. 13, 2001

(54) DATA DISPLAY APPARATUS AND METHOD, RECORDING MEDIUM AND DATA TRANSMISSION APPARATUS AND METHOD

(75) Inventor: Junichi Rekimoto, Tokyo (JP)

(73) Assignee: Sony Corporation, Tokyo (JP)

( * ) Notice: Under 35 U.S.C. 154(b), the term of this patent shall be extended for 0 days.

(21) Appl. No.: 09/122,975

(22) Filed: Jul. 27, 1998

(30) Foreign Application Priority Data

Jul. 28, 1997 (JP) .................................................. 9-201872

(51) Int. Cl.$^7$ ........................................................ G06F 3/00
(52) U.S. Cl. ............................................. 345/339; 345/157
(58) Field of Search .................................. 345/326, 335, 345/339, 348, 349, 350, 352, 354, 157, 162, 173, 179

(56) References Cited

U.S. PATENT DOCUMENTS

| | | | | |
|---|---|---|---|---|
| 4,451,895 | * | 5/1984 | Sliwkowski | 345/326 |
| 4,578,468 | * | 3/1986 | Racine | 700/293 |
| 4,677,258 | * | 6/1987 | Kawashima et al. | 178/18.01 |
| 5,010,323 | * | 4/1991 | Hoffman | 345/178 |
| 5,250,929 | * | 10/1993 | Hoffman et al. | 345/146 |
| 5,864,335 | * | 1/1999 | Kuzunuki et al. | 345/173 |
| 6,081,260 | * | 6/2000 | Kuzunuki et al. | 345/173 |

* cited by examiner

Primary Examiner—Crescelle N. dele Torre
(74) Attorney, Agent, or Firm—Limbach & Limbach L.L.P.; Seong-Kun Oh

(57) ABSTRACT

The present invention provides a data display apparatus by which data transmission between different image display portions can be performed by natural, easy and simple operations. The data display apparatus is provided with: a position information output unit for outputting position information concerning a place in a planar region portion in a case where the place in the planar region portion is designated; a data storage unit in which various data respectively corresponding to predetermined places in the planar region portion are stored; a data display unit having a display screen and a detection portion adapted to output a detection signal in a case where a place in the display screen is designated; and a control unit for performing a control operation of reading data according to and corresponding to position information from the data storage unit in a case of receiving a detection signal outputted from the data display unit after a place in the planar region portion is designated, and of displaying the read data on the display screen.

31 Claims, 2 Drawing Sheets

FIG. 2

| PAGE NO. | POSITION | DATA ID |
|---|---|---|
| 1 | 10.10 | xyj.gif |
| 1 | 20.10 | xyk.gif |
| 1 | 10.20 | ⋮ |
| 1 | 20.20 | ⋮ |
| 2 | 10.10 | ⋮ |
| ⋮ | ⋮ | ⋮ |

# DATA DISPLAY APPARATUS AND METHOD, RECORDING MEDIUM AND DATA TRANSMISSION APPARATUS AND METHOD

BACKGROUND OF THE INVENTION

1. Field of the Invention

The present invention relates to a data display apparatus and method, by which data transmission (or transferred) between different image display portions can be performed by natural, easy and simple operations (or manipulations), and to a recording medium on which a program of this data display method is recorded, and to a data transmission (or transmitting) apparatus and method.

2. Description of the Related Art

Hitherto, there has been used what is called a Drag-and-Drop technique, which is performed by using a mouse, as a manipulation technique for moving information displayed on the screen of a monitor in a computer system. This is a technique of grabbing and pulling (namely, dragging) an object displayed on the screen of the monitor of the computer system, for example, an icon, which represents information on the presence of files stored in a data storage medium such as a hard disk, with a mouse. When the icon is moved to the position of another icon representing a desired folder, the dragged icon is released (namely, dropped) at this position. In accordance with this Drag-and-Drop technique, by moving an icon on the screen of the monitor, the movement of data within the aforementioned data storage medium or between data storage media is displayed thereon as if an actual physical object were moved. Thus, users can perform an operation by intuition and with a natural feel (or feeling).

Meanwhile, hitherto, there is no user interface technique by which a user can perform an operation by intuition and with a natural feel in the case that an object, such as an icon, is moved between different image display portions. For instance, the movement (or displacement) of the aforementioned object between the screens of different monitors has been performed by executing a command for remote copying of a file or for transferring information or by performing an operation of moving an icon on the screen of a monitor.

However, in the case of such a conventional user interface technique, an operation is completed within the screen of a monitor when a data transmission is performed between different image display portions. Thus, this conventional user interface technique cannot provide a user with a feeling that he or she moves an actual object.

SUMMARY OF THE INVENTION

The present invention is proposed in view of such conditions. Accordingly, an object of the present invention is to provide a data display apparatus and method, by which data transmission between different image display portions can be performed by natural, easy and simple operations, and to provide a recording medium on which a program of this data display method is recorded, and to provide a data transmission apparatus and method.

To achieve the foregoing object, in accordance with an aspect of the present invention, there is provided a data display apparatus which comprises: a position information output means for outputting position information concerning a place in a flat (or planar) region portion in a case that the place in the aforesaid flat region portion is designated; a data storage means in which various data respectively corresponding predetermined places in the aforesaid flat region portion are stored; a data display means having a display screen and a detection portion adapted to output a detection signal in a case that a place in the aforesaid display screen is designated; and a control means for performing a control operation of reading data according to and corresponding to position information from the aforesaid data storage means in a case of receiving a detection signal outputted from the aforesaid data display unit after a place in said flat region portion is designated, and of displaying the read data on the aforesaid display screen.

In accordance with the case of such data display apparatus, in the case where a predetermined place on the flat region portion of the position information output means is designated, and further, the display screen of the aforementioned display apparatus is designated, the control means performs a control operation by reading the corresponding data from the data storage means according to the position information outputted by the position information output means.

To achieve the foregoing object, in accordance with another aspect of the present invention, there is provided a data display method which comprises: a position information outputting step of outputting position information concerning a place in a flat region portion in a case that the place in the aforesaid flat region portion is designated; a display screen designating step of designating a display screen of a data display means; and a control step of performing a control operation of reading data according to and corresponding to the aforesaid position information from the aforesaid data storage means and displaying the read data on a display screen of the aforesaid data display means in a case of performing the aforesaid display screen designating step after the aforesaid position information outputting step.

In accordance with this data display method, in the case where a predetermined position in said flat region portion is designated and that said display screen is designated, corresponding screen is designated according to the aforesaid position information.

To achieve the foregoing object, in accordance with yet another aspect of the present invention, there is provided a recording medium storing a program for performing an operation comprising: a position information detecting process of detecting position information concerning a place in a flat region portion in a case that the place in the aforesaid flat region portion is designated; and a control process of reading data according to and corresponding to the aforesaid position information and displaying the read data on a display screen of a data display means in a case of designating the aforesaid display screen of said data display means after the aforesaid position information detecting process.

In accordance with this recording medium, the aforesaid program is read into a computer. Thus, the data is read according to and correspondingly to the position information, which is detected in the position information detecting process, and is displayed on the display screen of said display means in the case where a predetermined place on the flat region portion is designated and further, where the aforesaid display screen is designated.

To achieve the foregoing object, in accordance with still another aspect of the present invention, there is provided a data transmission apparatus which comprises: a position information output means for outputting position information concerning a place in a flat region portion in a case that the place in the aforesaid flat region portion is designated; a data storage means in which various data respectively corresponding predetermined places in the aforesaid flat region portion are stored; a network connection means for performing a data transmission through a network provided with a table in which at least information concerning presence of an output of the position information is described; and a control means for performing a control operation of describing information, which indicates that the position information is described in the aforesaid table, in a case where a place in the aforesaid flat region portion in the aforesaid position information output means, and of reading data according to and corresponding to position information from said data storage means when a data transmission request is acquired from an apparatus provided on said network.

In accordance with this data transmission apparatus, in the case where the predetermined place on the flat region portion in the position information output means is designated, the position information concerning the aforesaid place is outputted by this position information output means. Moreover, information, which indicates that the position information is outputted, is described by the control means into the table provided on the network. Next, as a result of designating an apparatus on the network, this apparatus checks the description written into the table and issues a data transmission request to the control means. Subsequently, the control means performs a control operation of reading data corresponding to the position information from the data storage means and then transmits the read data to the apparatus which has issued a transmission request.

To achieve the foregoing object, in accordance with yet another aspect of the present invention, there is provided a data transmission method comprising the steps of: outputting position information concerning a place in a flat region portion in a case that the place in the aforesaid flat region portion is designated, and describing information, which indicates that the position information is outputted, in a table provided on a network; and reading corresponding data according to the position information from a data storage means and transmitting the read corresponding data to an apparatus provided on the aforesaid network when a data transmission request is further obtained from the aforesaid apparatus provided on said network.

BRIEF DESCRIPTION OF THE DRAWINGS

Other features, objects and advantages of the present invention will become apparent from the following description of preferred embodiments with reference to the drawings in which like reference characters designate like or corresponding parts throughout several views.

FIG. 2 is a diagram illustrating an example of a data management table to which a control portion refers.

DETAILED DESCRIPTION OF THE PREFERRED EMBODIMENTS

Figure 1:
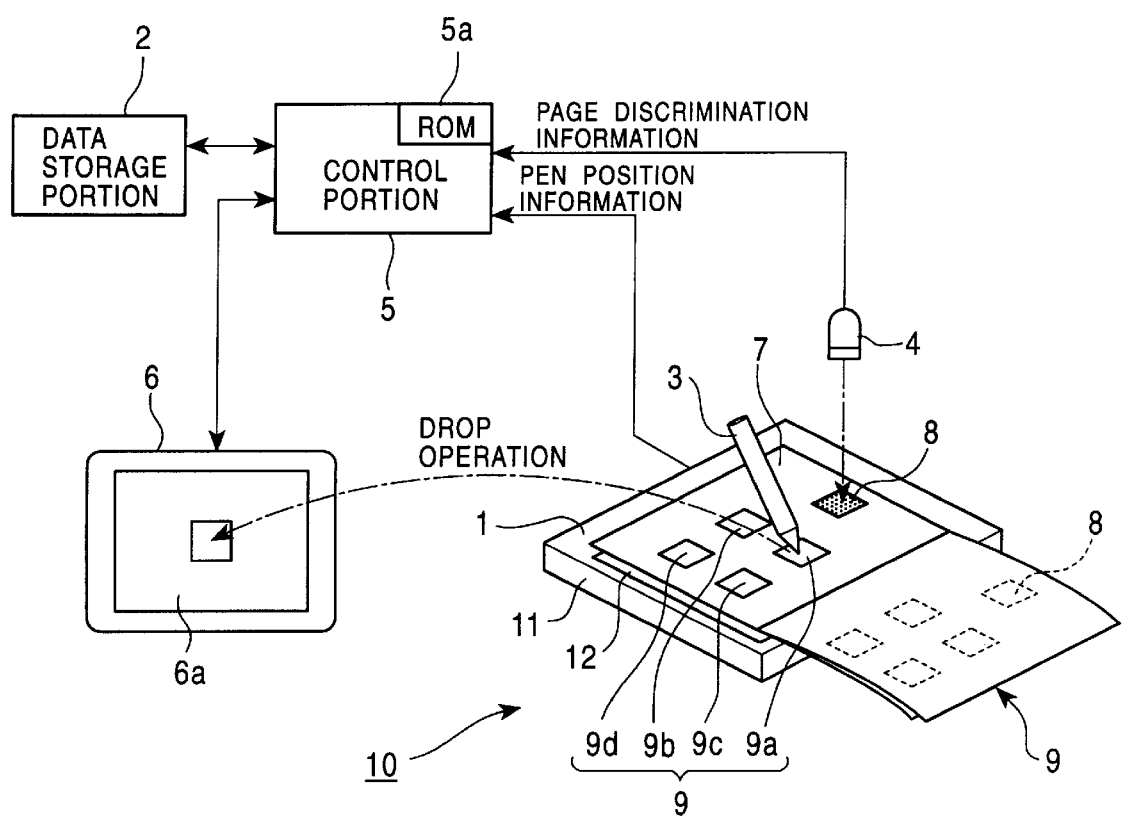
FIG. 1 is a block diagram illustrating the configuration of a data display apparatus to which the present invention is applied.

Hereinafter, the preferred embodiments of the present invention will be described in detail by referring to the accompanying drawings. A data display apparatus illustrated in FIG. 1, to which the present invention is applied, is provided with: a tablet 1; a data storage portion 2; a designating pen 3; an image pickup camera 4; a control portion 5 for controlling the entire apparatus; and an image display portion 6. Further, this data display apparatus 10 is brought into an operable (or ready) state by setting a data pamphlet 7 (to be described later).

The tablet 1 has a nearly-rectangular flat plate-like body (or casing) 11 as shown in FIG. 1. Further, a nearly-rectangular flat region portion 12 is formed on the top surface of this body. When a predetermined place in this flat region portion 12 is pushed by the designating pen 3, the tablet 1 outputs position information representing the position, namely, the X- and Y- coordinates of the place, which is pushed by the aforementioned designating pen 3, to the aforementioned control portion 5 as pen position information. Incidentally, when actually using the tablet 10, the aforementioned data pamphlet 7 is put on this flat region portion 12, so that predetermined places in this flat region portion 12 is pushed by the designating pen 3 through the data pamphlet 7.

The data storage portion 2 is adapted to store various data respectively corresponding to the predetermined places on the flat region portion 12 of the aforementioned tablet 1 and is constituted by a device containing a database, for example, a hard disk drive or a server. Practical data to be stored in the data storage portion 2 correspond to data marks 9 (to be described later), which is put on the data pamphlet 7. Namely, data to be stored in the portion 2 are image data concerning the data marks 9 themselves, and image data and/or character data concerning more detailed information on the data marks 9.

The designating pen 3 is a pointing device shaped like a pen and is used for an input interface in the data display apparatus 10. Users perform input operations on the image display portion 6 by using this designating pen 3 instead of other input devices such as a mouse and a track ball. Namely, users can perform an operation of clicking a mouse button on an icon, the aforementioned Drag-and-Drop operation and an operation of inputting a character and a figure by handwriting thereof with the aid of this designating pen 3.

As shown in FIG. 1, the image pickup camera 4 is placed above the tablet 1 by setting a downwardly vertical direction as an imaging direction as shown in FIG. 1. This image pickup camera 4 is operative to supply page identification information, which is obtained by imaging the page identification mark 8 (to be described later) of the aforementioned data pamphlet 7, to the control portion 5.

The image display portion 6 has a monitor screen 6a for displaying an image, and is adapted to display image signals supplied from the aforementioned control portion 5 Further, the image display portion 6 has a transparent tablet (not shown) on the surface of this monitor screen 6a. This transparent tablet is adapted to output an detection signal when the designated pen 3 touches the surface of the monitor screen 6a.

The data pamphlet 7 is configured like a pamphlet containing a plurality of pages. The page identification mark 8 representing a corresponding page No. is printed on a predetermined position on each page of the data pamphlet. Further, a plurality of the data marks 9 (namely, 9a, 9b, 9c, 9d) are printed at predetermined positions on each page thereof, respectively. These data marks 9 correspond to icons displayed on a monitor of a personal computer system. Moreover, for instance, a picture of a living thing, a landscape photo taken while traveling, and characters representing a place where the photo is taken are printed as the data marks 9 according to the uses thereof.

Incidentally, in the case of this embodiment, the four data marks 9a, 9b, 9c and 9d are printed on each page. However, the number of the data marks 9 printed on each page is not limited to a specific one.

The control portion 5 has a ROM 5a and is operative to control the entire apparatus according to a control program stored in this ROM 5a. Practically, the control portion 5 supplies image signals to the image display portion 6 so as to initialize each block at turn-on and cause the image display portion 6 to display an initial screen.

Furthermore, in the case that the designating pen 3 touches the monitor screen 6a of the image display portion 6, to which data is transmitted, after a predetermined place on the flat region portion 12 of the tablet 1 is designated by the pen 3, the control portion 5 performs a control operation of reading the corresponding data from the data storage portion 2 according to the page identification information sent from the image pickup camera 4 and the pen position information sent from the tablet 1.

Practically, the control portion 5 performs the aforementioned control operation by referring to a data management table in which a page number, position data representing a position on the flat region portion 12 of the tablet 1, and a data ID (for example, a file name) corresponding to the page number and the position data are described. Namely, the control portion 5 recognizes the page number of a currently set page of the data pamphlet 7 on the basis of the page identification information sent from the image pickup camera 4. Then, the control portion 5 detects the closest position data, which has a value closest to that of the pen position, among position data described in the aforesaid table according to the pen position information sent from the tablet 1. Further, the control portion 5 detects a data ID corresponding to such page number and position data. Subsequently, the control portion 5 reads the data corresponding to this data ID from the data storage portion 2 and then waits for the aforementioned detection signal sent from the image display portion 6 and supplies the read data to the image display portion 6 when receiving the detection signal.

Thus, in the data display apparatus 10, in the case where a user causes the designating pen 3 to touch the monitor screen 6a of the image display portion 6 after he or her designates a predetermined position on the flat region portion 12 of the tablet 1 with the pen 3 through the data mark 9 of the data pamphlet 7, corresponding data is read from the data storage portion 2 and is then displayed on the monitor screen 6a. Consequently, the data transmission between different image display portions can be achieved by performing a natural, easy and simple operation.

Namely, a user pushes the data mark 9 formed on the data pamphlet 7 set on the tablet 1 with the pen point of the designating pen 3 and then releases the pen point therefrom. Thus, a pick operation of selecting the aforesaid data mark 9 is accomplished. After this selection, a drop operation of displaying the aforesaid data mark 9 itself or information related to the data mark 9 is performed by bringing this pen point into contact with the monitor screen 6a of the image display portion 6. Such a Pick-and-Drop operation can be performed in such a manner as to cause a user to feel as if an actual physical object were moved. Consequently, the Pick-and-Drop operation is extremely natural, easy and simple for users.

Incidentally, in the case of using the data display apparatus 10 in, for example, drawing a picture, a data pamphlet 7, on which various sample pictures are printed as the data marks 9, should be used. In this case, it is convenient in using the apparatus to print a same kind of the data marks 9 on each page. For example, pictures of animals are printed as the data marks 9 on a first page. Further, pictures of insects are printed as the data marks 9 on a second page. Moreover, pictures of plants are printed as the data marks 9 on a third page. Thus, by designating (namely, picking) one of the sample pictures of animals printed as the data marks 9 on the first page with the designating pen 3, the designated picture of the animal can be copied (namely, dropped) onto the monitor screen 6a, as is.

Further, in the case of using the data display apparatus 10 for a traveler's guide, the data pamphlet 7, on which landscape photos taken at traveler's destinations and characters representing the destinations are printed as the data marks 9, should be used. In this case, it is convenient to print a same kind of the data marks 9 on each page. For example, the data marks 9 concerning the destinations of domestic tours are printed on a first page. Further, the marks 9 concerning the destinations of trips to the United States of America are printed on a second page. Moreover, the marks 9 concerning the destinations of tours in Europe are printed on a third page. Thus, by designating (namely, picking) one of the data marks 9 representing the landscapes of the destinations of the domestic tours and the characters indicating the destinations printed on the first page with the designating pen 3, detailed data necessary for travelling to the corresponding destination, for instance, data representing a travel agent making travel arrangements for tourists of the corresponding tour, the traveling expenses, itinerary, means of transportation and accommodations can be displayed on (namely, dropped onto) the monitor screen 6a.

Incidentally, this embodiment is provided with the single data storage portion 2. However, the apparatus may be provided with two data storage portions or more. In this case, information concerning the directory, which indicates the address or destination of the corresponding one of the data storage portions 2, is added to the column, which corresponds to the data ID, of the data management table of FIG. 2.

Further, the network system (hereunder referred to as a data transmission system 10) may be configured by employing a portable terminal called a PDA (Personal Digital Assistant), which is a monitor device being capable of inputting/outputting data, as the image display portion 6 and connecting such a single terminal or a plurality of such terminals to the control portion 5 through an interface (not shown).

In this case, a table for managing whether or not the pen position information is outputted from the tablet 1 is provided on the network. Further, this table is adapted so that each of the terminals and control portion 5 can refer thereto. Moreover, in the case where the designating pen 3 designates a predetermined position on the flat region portion 12 of the tablet 1, the control portion 5 writes information (for example, "1"), which indicates that the pen position information is outputted, to this table. Furthermore, in the case where the designating pen 3 touches the monitor screen 6a of the terminal (hereunder referred to as a PDA 6) acting as a destination of the data transmission, this PDA 6 refers to the aforementioned table and then ascertains that the pen position information is outputted. Thereafter, the PDA 6 issues a data transmission request to the control portion 5. Subsequently, the control portion 5 performs a control operation of reading corresponding data from the data storage portion 2 according to the page identification information sent from the image pickup camera 4 and to the pen position information sent from the tablet 1 and of then transmitting the read data to the PDA 6. Incidentally, after transmitting the data to the PDA 6, the control portion 5 changes the numerical value "1", which is described in the aforementioned table, to another value (for instance, "0")

representing information which indicates that the pen position information is not outputted.

Thus, even in the case of the data transmission system 10, when a user causes the designating pen 3 to touch the monitor screen 6a of the PDA 6 after he or she designates a predetermined position on the flat region portion 12 of the tablet 1 with the pen 3 through the data mark 9 of the data pamphlet 7, corresponding data is read from the data storage portion 2 and is displayed on the monitor screen 6a. Consequently, the data transmission between different image display portions can be effected by performing a natural, easy and simple operation.

As above described in detail, in the case of the data display apparatus of the present invention, when a place on the flat region portion in the position information output means is designated, and further, the display screen of the data display means is designated, the control means reads corresponding data from the data storage means according to the position information outputted by the position information output means, and performs a control operation of displaying the data on the display screen of the display unit. Thus, the data transmission between different image display portions can be achieved by performing a natural, easy and simple operation.

Further, in accordance with the data display method of the present invention, in the case where a predetermined place on the flat region portion is designated, and further, the display screen of the data display means is designated, corresponding data is read according to position information outputted in the position information output step. Then, the data is displayed on the display screen. Thus, the data transmission between different image display portions can be attained by performing a natural, easy and simple operation.

Moreover, in accordance with the recording medium of the present invention, there is stored a program for reading corresponding data according to the position information detected in the position information detecting process and then displaying the control process of displaying the data on the display screen in the case where a predetermined place on the flat region portion is designated, and further, the display screen of the data display means is designated.

Furthermore, in accordance with the data transmission apparatus and method of the present invention, in the case where a place on the flat region portion is designated, and further, an apparatus on the network is designated, the control means performs a control operation of reading corresponding data from the data storage means according to the position information and then transmitting the data to the aforementioned apparatus provided on the network. Thus, the data transmission between different image display portions can be accomplished by performing a natural, easy and simple operation.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A data display apparatus, comprising:
position information output means for outputting position information corresponding to a position in a flat region portion when the position on said flat region portion is designated;

data storage means for storing data respectively corresponding to predetermined positions in said flat region portion;

data display means having a display screen and a detection portion adapted to output a detection signal when a position on said display screen is designated;

control means for reading data according to and corresponding to position information from said data storage means when said detection signal outputted from said data display means is received after the position on said flat region portion is designated, and for displaying the read data on said display screen; and identification mark recognizing means for recognizing an identification mark used for identifying each page, and a data mark, and outputting identification mark information representing the recognized identification mark when a pamphlet member, each including a corresponding identification mark and a data mark, is placed on said flat region portion.

2. A data display method, comprising the steps of:
outputting position information corresponding to a position in a flat region portion when the position on said flat region portion is designated;

designating a display screen of a data display means;

performing a control operation of reading data according to and corresponding to said position information from said data storage means and displaying the read data on said display screen when said display screen is designated after said position information outputting step; and recognizing an identification mark used for identifying each page and a data mark, and outputting identification mark information representing the recognized identification mark when a pamphlet member, each including a corresponding identification mark and a data mark, is placed on said flat region portion.

3. A recording medium storing a program for performing an operation, comprising:
a position information detecting process of detecting position information corresponding to a position in a flat region portion when the position on said flat region portion is designated;

a control process of reading data according to and corresponding to said position information and displaying the read data on a display screen of a data display means when said display screen of said data display means is designated after said position information detecting process; and an identification mark recognizing process of recognizing an identification mark used for identifying each page, and a data mark, and outputting identification mark information representing the recognized identification mark when a pamphlet member, each including a corresponding identification mark and a data mark, is placed on said flat region portion.

4. A data transmission apparatus, comprising:
position information output means for outputting position information corresponding to a position on a flat region portion when the position in said flat region portion is designated;

data storage means for storing data respectively corresponding predetermined places in said flat region portion;

network connection means for performing data transmission through a network provided with a table in which at least information concerning presence of an output of the position information is stored;

control means for performing a control operation of storing information which indicates that the position information is stored in said table when said position on said flat region portion is designated, and of reading data according to and corresponding to position information from said data storage means when a data transmission request is received from an apparatus provided on said network; and identification mark recognizing means for recognizing an identification mark used for identifying each page, and a data mark, and outputting identification mark information representing the recognized identification mark when a pamphlet member, each including a corresponding identification mark and a data mark, is placed on said flat region portion;

wherein said apparatus issues said data transmission request after a position on a display of said apparatus is designated.

5. The apparatus of claim 4 wherein said apparatus include a portable electronic device.

6. The apparatus of claim 5 wherein said portable electronic device includes a personal digital assistant.

7. The apparatus of claim 4 wherein said network connection means includes wireless data transmission.

8. A data transmission method, comprising the steps of:

outputting position information corresponding to a position in a flat region portion when the position in said flat region portion is designated;

storing information indicating that the position information is outputted in a table provided on a network; and reading corresponding data according to the position information from a data storage means and transmitting the read corresponding data to an apparatus provided on said network when a data transmission request is obtained from said apparatus provided on said network;

wherein said apparatus issues said data transmission request after a position on a display of said apparatus is designated; and further wherein information representing an identification mark is outputted as identification mark information when a pamphlet member, each including a corresponding identification mark and a data mark, is placed on said flat region portion.

9. The method of claim 8 wherein said apparatus includes a portable electronic device.

10. The method of claim 9 wherein said portable electronic device includes a personal digital assistant.

11. The method of claim 8 wherein said network includes a wireless data transmission network.

12. A data display apparatus, comprising:

a position information output unit for outputting position information corresponding to a position in a flat region portion when the position on said flat region portion is designated;

a data storage unit for storing data respectively corresponding to predetermined positions in said flat region portion;

a data display unit having a display screen and a detection portion adapted to output a detection signal when a position on said display screen is designated;

a controller for reading data according to and corresponding to position information from said data storage unit when said detection signal outputted from said data display unit is received after the position in said flat region portion is designated, and for displaying the read data on said display screen; and an identification mark recognizing unit for recognizing an identification mark used for identifying each page, and a data mark, and outputting identification mark information representing the recognized identification mark when a pamphlet member, each including a corresponding identification mark and a data mark, is placed on said flat region portion.

13. The apparatus of claim 12 wherein said position information output unit includes a tablet and a stylus, said tablet including said flat region portion and said stylus for designating said position on said flat region.

14. The apparatus of claim 12 wherein said data storage unit includes a database.

15. The apparatus of claim 12 wherein said data display unit includes one of a computer monitor and a portable electronic device.

16. The apparatus of claim 15 wherein said portable electronic device includes a personal digital assistant.

17. The apparatus of claim 12 wherein said data display unit is configured to transmit said detection signal to said controller via a wireless network.

18. A data display apparatus, comprising:

position information output means for outputting position information corresponding to a position in a flat region portion when the position on said flat region portion is designated;

data storage means for storing data respectively corresponding to predetermined positions in said flat region portion;

data display means having a display screen and a detection portion adapted to output a detection signal when a position on said display screen is designated;

control means for reading data according to and corresponding to position information from said data storage means when said detection signal outputted from said data display means is received after the position on said flat region portion is designated, and for displaying the read data on said display screen; and identification mark recognizing means for recognizing an identification mark used for identifying each page, and a data mark, and outputting identification mark information representing the recognized identification mark when a pamphlet member, each including a corresponding identification mark and a data mark, is placed on said flat region portion;

wherein various kinds of data respectively corresponding to said identification mark and the predetermined position on said flat region portion are stored in said data storage means; and further wherein said control means reads corresponding data from said data storage means according to the identification mark information and the position information when said control means receives the detection signal from said data display means after the position on said flat region portion is designated by indicating said data mark on said pamphlet member.

19. The apparatus of claim 18 wherein said control means performs the control operation by referring to a table in which at least a page number that corresponds to identification mark information, position data that corresponds to the position information, and a file name corresponding to the position data are stored.

20. The apparatus of claim 18 further including a plurality of data storage means, wherein said control means performs the control operation by referring to a table in which at least a page number that corresponds to identification mark information, position data that corresponds to the position information, a file name that corresponds to the position data, and data representing one of said data storage means which stores the file corresponding to the file name, are stored.

21. A data display method, comprising the steps of:
outputting position information corresponding to a position in a flat region portion when the position on said flat region portion is designated;
designating a display screen of a data display means;
performing a control operation of reading data according to and corresponding to said position information from said data storage means and displaying the read data on said display screen when said display screen is designated after said position information outputting step; and
recognizing an identification mark used for identifying each page and a data mark, and outputting identification mark information representing the recognized identification mark when a pamphlet member, each including a corresponding identification mark and a data mark, is placed on said flat region portion;
wherein, in said control step, corresponding data is read from said data storage means according to the identification mark information obtained in said identification mark recognizing step and the position information obtained in said position information outputting step, when said display screen is designated after designating a position on said flat region portion by indicating said data mark on said pamphlet member.

22. The method of claim 21 wherein, in said control step, the control operation is performed by referring to a table in which at least a page number that corresponds to identification mark information, position data that corresponds to the position information, and a file name corresponding to the position data are stored.

23. The method of claim 21 wherein the corresponding data are stored in a plurality of data storage means, and wherein, in said control step, the control operation is performed by referring to a table in which at least a page number that corresponds to identification mark information, position data that corresponds to the position information, a file name that corresponds to the position data, and data representing one of said data storage means, which stores the file corresponding to the file name, are stored.

24. A recording medium storing a program for performing an operation, comprising:
a position information detecting process of detecting position information corresponding to a position in a flat region portion when the position on said flat region portion is designated;
a control process of reading data according to and corresponding to said position information and displaying the read data on a display screen of a data display means when said display screen of said data display means is designated after said position information detecting process; and
an identification mark recognizing process of recognizing an identification mark used for identifying each page, and a data mark, and outputting identification mark information representing the recognized identification mark when a pamphlet member, each including a corresponding identification mark and a data mark, is placed on said flat region portion, and wherein, in said control step, corresponding data is read according to the identification mark information obtained in said identification mark recognizing process, and the position information obtained in said position information detecting process when the display screen of said data display means is designated upon completion of said designating process of designating a position on said flat region portion by indicating said data mark on said pamphlet member.

25. The medium of claim 24 wherein said control process is performed by referring to a table in which at least a page number that corresponds to identification mark information, position data that corresponds to the position information, and a file name corresponding to the position data are stored.

26. The medium of claim 24 wherein the corresponding data are stored in a plurality of data storage means, and wherein the control process is performed by referring to a table in which at least a page number that corresponds to identification mark information, position data that corresponds to the position information, a file name that corresponds to the position data, and data representing one of said data storage means, which stores the file corresponding to the file name, are stored.

27. A data transmission apparatus, comprising:
position information output means for outputting position information corresponding to a position on a flat region portion when the position in said flat region portion is designated;
data storage means for storing data respectively corresponding predetermined places in said flat region portion;
network connection means for performing data transmission through a network provided with a table in which at least information concerning presence of an output of the position information is stored;
control means for performing a control operation of storing information which indicates that the position information is stored in said table when said position on said flat region portion is designated, and of reading data according to and corresponding to position information from said data storage means when a data transmission request is received from an apparatus provided on said network; and
identification mark recognizing means for recognizing an identification mark used for identifying each page, and a data mark, and outputting identification mark information representing the recognized identification mark when a pamphlet member, each including a corresponding identification mark and a data mark, is placed on said flat region portion;
wherein said apparatus issues said data transmission request after a position on a display of said apparatus is designated;
wherein various kinds of data respectively corresponding to said identification mark and the predetermined position on said flat region portion are stored in said data storage means; and
wherein said control means is adapted to store information in the table indicating that the position information is outputted to the table when a position in said flat region portion is specified by designating the data mark on said pamphlet member, and to read corresponding data from said data storage means according to the identification mark information and the position information when said control means receives said data transmission request from said apparatus provided on said network.

28. A data transmission method, comprising the steps of:

outputting position information corresponding to a position in a flat region portion when the position in said flat region portion is designated;

storing information indicating that the position information is outputted in a table provided on a network; and reading corresponding data according to the position information from a data storage means and transmitting the read corresponding data to an apparatus provided on said network when a data transmission request is obtained from said apparatus provided on said network;

wherein said apparatus issues said data transmission request after a position on a display of said apparatus is designated;

wherein information representing an identification mark is outputted as identification mark information when a pamphlet member, each including a corresponding identification mark and a data mark, is placed on said flat region portion, wherein a position on said flat region portion is designated by indicating the data mark placed on said pamphlet member, and wherein corresponding data is read from said data storage means according to the identification mark information and the position data.

29. A data display apparatus, comprising:

a position information output unit for outputting position information corresponding to a position in a flat region portion when the position on said flat region portion is designated;

a data storage unit for storing data respectively corresponding to predetermined positions in said flat region portion;

a data display unit having a display screen and a detection portion adapted to output a detection signal when a position on said display screen is designated;

a controller for reading data according to and corresponding to position information from said data storage unit when said detection signal outputted from said data display unit is received after the position in said flat region portion is designated, and for displaying the read data on said display screen; and an identification mark recognizing unit for recognizing an identification mark used for identifying each page, and a data mark, and outputting identification mark information representing the recognized identification mark when a pamphlet member, each including a corresponding identification mark and a data mark, is placed on said flat region portion;

wherein various kinds of data respectively corresponding to said identification mark and the predetermined position on said flat region portion are stored in said data storage unit; and further wherein said controller reads corresponding data from said data storage unit according to the identification mark information and the position information when said controller receives the detection signal from said data display unit after the position said flat region portion is designated by indicating said data mark on said pamphlet member.

30. The apparatus of claim 29 wherein said controller performs the control operation by referring to a table in which at least a page number that corresponds to identification mark information, position data that corresponds to the position information, and a file name corresponding to the position data are stored.

31. The apparatus of claim 29 further including a plurality of data storage unit, wherein said controller performs the control operation by referring to a table in which at least a page number that corresponds to identification mark information, position data that corresponds to the position information, a file name that corresponds to the position data, and data representing one of said data storage unit which stores the file corresponding to the file name, are stored.

* * * * *